US010085050B2

United States Patent
Li et al.

(10) Patent No.: US 10,085,050 B2
(45) Date of Patent: Sep. 25, 2018

(54) METHOD AND APPARATUS FOR ADJUSTING VIDEO QUALITY BASED ON NETWORK ENVIRONMENT

(71) Applicant: Xiaomi Inc., Beijing (CN)

(72) Inventors: Feiyun Li, Beijing (CN); Ziguang Gao, Beijing (CN); Ming Zhao, Beijing (CN)

(73) Assignee: Xiaomi Inc., Beijing (CN)

( * ) Notice: Subject to any disclaimer, the term of this patent is extended or adjusted under 35 U.S.C. 154(b) by 443 days.

(21) Appl. No.: 14/738,165

(22) Filed: Jun. 12, 2015

(65) Prior Publication Data

US 2016/0050398 A1     Feb. 18, 2016

Related U.S. Application Data

(63) Continuation of application No. PCT/CN2015/074610, filed on Mar. 19, 2015.

(30) Foreign Application Priority Data

Aug. 15, 2014 (CN) .......................... 2014 1 0404533

(51) Int. Cl.
*H04N 7/18* (2006.01)
*H04N 5/38* (2006.01)
(Continued)

(52) U.S. Cl.
CPC ... *H04N 21/234354* (2013.01); *H04N 19/115* (2014.11); *H04N 19/164* (2014.11);
(Continued)

(58) Field of Classification Search
CPC ........ H04N 7/185; H04N 5/38; H04N 19/172; H04N 19/115; H04N 19/164;
(Continued)

(56) References Cited

U.S. PATENT DOCUMENTS 6,519,004 B1    2/2003 Bahl
7,162,513 B1 *  1/2007 Kister ................. G06Q 10/107
                                                 709/203
(Continued)

FOREIGN PATENT DOCUMENTS

CN    101552771 A   10/2009
CN    101697554 A    4/2010
(Continued)

OTHER PUBLICATIONS

Office Action in counterpart Russian Application No. 2015124150/07(037756), dated Mar. 23, 2016 and English translation thereof.
(Continued)

*Primary Examiner* — Thai Tran
*Assistant Examiner* — Nien-Ru Yang
(74) *Attorney, Agent, or Firm* — Finnegan, Henderson, Farabow, Garrett & Dunner LLP

(57) ABSTRACT

A method for adjusting video quality based on a network environment is provided. The method includes receiving a target frame serial number of a lost video frame from a terminal device, and using a time when the target frame serial number is received as a timestamp of the target frame serial number; determining a number of target frame serial numbers corresponding to timestamps within a predefined time period; decreasing a designated image quality parameter according to a predefined configuration when the number of target frame serial numbers is greater than a first threshold; and increasing the designated image quality parameter according to the predefined configuration when the number of target frame serial numbers is less than a second threshold. The first threshold is greater than the second threshold.

6 Claims, 16 Drawing Sheets

(51) Int. Cl.
*H04N 21/2343* (2011.01)
*H04N 21/442* (2011.01)
*H04N 21/6379* (2011.01)
*H04N 19/172* (2014.01)
*H04N 19/115* (2014.01)
*H04N 19/164* (2014.01)
*H04N 19/895* (2014.01)
*H04N 19/124* (2014.01)

(52) U.S. Cl.
CPC ......... *H04N 19/172* (2014.11); *H04N 19/895* (2014.11); *H04N 21/44209* (2013.01); *H04N 21/6379* (2013.01); *H04N 7/18* (2013.01); *H04N 19/124* (2014.11)

(58) Field of Classification Search
CPC ..... H04N 21/234354; H04N 21/44209; H04N 21/6379; H04N 19/895; H04N 19/124; H04N 7/18
USPC ...................................................... 348/158
See application file for complete search history.

(56) References Cited

U.S. PATENT DOCUMENTS

| | | | |
|---|---|---|---|
| 7,969,997 | B1 | 6/2011 | Noh et al. |
| 2007/0206673 | A1 | 9/2007 | Cipolli et al. |
| 2008/0165864 | A1 | 7/2008 | Eleftheriadis et al. |
| 2008/0291842 | A1* | 11/2008 | Isambart ............... H04N 17/004 370/252 |
| 2010/0172335 | A1 | 7/2010 | Mok |
| 2012/0075525 | A1* | 3/2012 | Bennett ................ H04N 19/172 348/441 |

FOREIGN PATENT DOCUMENTS

| | | |
|---|---|---|
| CN | 101753980 A | 6/2010 |
| CN | 101909060 A | 12/2010 |
| CN | 101931799 A | 12/2010 |
| CN | 101964732 A | 2/2011 |
| CN | 102484748 A | 5/2012 |
| CN | 102547269 A | 7/2012 |
| CN | 102547282 A | 7/2012 |
| CN | 103702139 A | 4/2014 |
| CN | 103780971 A | 5/2014 |
| CN | 103916367 A | 7/2014 |
| CN | 104202614 A | 12/2014 |
| EP | 2 400 758 A1 | 12/2011 |
| GB | 2461768 A | 1/2010 |
| GB | 2469281 A | 10/2010 |
| JP | 03-165193 A | 7/1991 |
| JP | 2003-258885 A | 9/2003 |
| JP | 2004-526372 A | 8/2004 |
| JP | 2012-070113 A | 4/2012 |
| JP | 2014-027613 A | 2/2014 |
| KR | 10-2007-0043926 | 4/2007 |
| KR | 10-2012-0107042 | 9/2012 |
| RU | 2409007 C1 | 1/2011 |
| WO | WO 2013/053385 A1 | 4/2013 |

OTHER PUBLICATIONS

Extended Search Report for European Application No. 15181271.6 from the European Patent Office, dated Nov. 4, 2015.
Eleftheriadis, A. et al., *Error Resilence using Frame Numbers in Key Pictures*, Joint Video Team (JVT) of ISO/IEC MPEG & ITU-T VCEG, 21$^{st}$ Meeting: Hangzhou China, Oct. 20-27, 2006—Layered Media, Inc.
English version of International Search Report of PCT Application No. PCT/CN2015/074610, dated Jul. 3, 2015, issued by ISA/CN.
International Search Report of PCT Application No. PCT/CN2015/074610, dated Jul. 3, 2015, issued by ISA/CN (4 pages).

* cited by examiner

METHOD AND APPARATUS FOR ADJUSTING VIDEO QUALITY BASED ON NETWORK ENVIRONMENT

CROSS REFERENCE TO RELATED APPLICATIONS

This application is a continuation of International Application No. PCT/CN2015/074610 filed Mar. 19, 2015, which is based upon and claims priority to Chinese Patent Application No. 201410404533.6, filed Aug. 15, 2014, the entire contents of all of which are incorporated herein by reference.

TECHNICAL FIELD

The present disclosure relates to the field of communication technologies and, more particularly, to a method and apparatus for adjusting video quality based on a network environment.

BACKGROUND

With the development of technologies, smart cameras have been widely used. For example, a user installs a smart camera at home, which sends video images of the home in real time to a mobile terminal carried by the user, thereby improving home security.

SUMMARY

According to a first aspect of the present disclosure, there is provided a method for adjusting video quality based on a network environment. The method includes receiving a target frame serial number of a lost video frame from a terminal device, and using a time when the target frame serial number is received as a timestamp of the target frame serial number; determining a number of target frame serial numbers corresponding to timestamps within a predefined time period; decreasing a designated image quality parameter according to a predefined configuration when the number of target frame serial numbers is greater than a first threshold; and increasing the designated image quality parameter according to the predefined configuration when the number of target frame serial numbers is less than a second threshold. The first threshold is greater than the second threshold.

According to a further aspect of the present disclosure, there is provided a method for adjusting video quality based on a network environment. The method includes receiving a video frame carrying a frame serial number from an image collecting device. The video frame carrying a frame serial number is formed by the image collecting device by compressing video data using a predefined video coding method according to a designated image quality parameter. The method further includes determining, according to a predefined judgment criterion, whether a target frame serial number of a lost video frame exists; and if it is determined that a target frame serial number of a lost video frame exists, sending the target frame serial number of the lost video frame to the image collecting device, such that the image collecting device uses a time when the target frame serial number is received as a timestamp of the target frame serial number, and determines a number of target frame serial numbers corresponding to timestamps within a predefined time period, to adjust the designated image quality parameter.

According to another aspect of the present disclosure, there is provided an apparatus for adjusting video quality based on a network environment. The apparatus includes one or more processors, and a memory for storing instructions executable by the one or more processors. The one or more processors are configured to perform: receiving a target frame serial number of a lost video frame from a terminal device, and using a time when the target frame serial number is received as a timestamp of the target frame serial number; determining a number of target frame serial numbers corresponding to timestamps within a predefined time period; decreasing a designated image quality parameter according to a predefined configuration when the number of target frame serial numbers is greater than a first threshold; and increasing the designated image quality parameter according to the predefined configuration when the number of target frame serial numbers is less than a second threshold. The first threshold is greater than the second threshold.

According to another aspect of the present disclosure, there is provided an apparatus for adjusting video quality based on a network environment. The apparatus includes one or more processors, and a memory for storing instructions executable by the one or more processors. The one or more processors are configured to perform: receiving a video frame carrying a frame serial number from an image collecting device. The video frame carrying a frame serial number is formed by the image collecting device by compressing video data using a predefined video coding method according to a designated image quality parameter. The one or more processors are further configured to perform: determining, according to a predefined judgment criterion, whether a target frame serial number of a lost video frame exists; and if it is determined that a target frame serial number of a lost video frame exists, sending the target frame serial number of the lost video frame to the image collecting device, such that the image collecting device uses a time when the target frame serial number is received as a timestamp of the target frame serial number, and determines the number of target frame serial numbers corresponding to timestamps within a predefined time period, to adjust the designated image quality parameter.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the present invention as recited in the appended claims.

Figure 1:
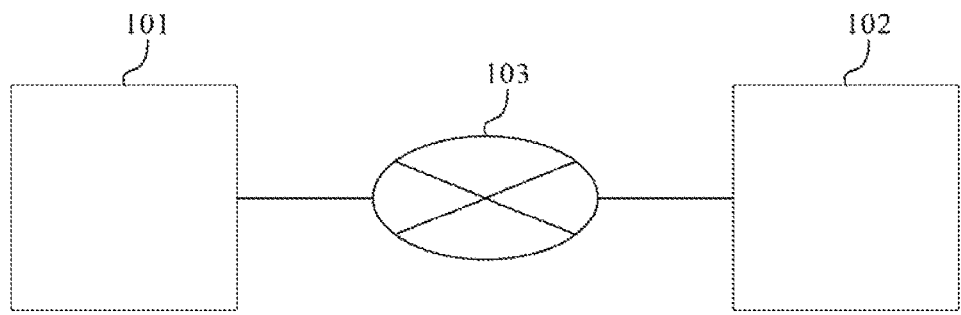
FIG. 1 is a block diagram of a system for adjusting video quality based on a network environment, according to an exemplary embodiment.

FIG. 1 is a block diagram of a system 100 for adjusting video quality based on a network environment, according to an exemplary embodiment. The system 100 includes an image collecting device 101 (such as a smart camera, a recording device, etc.), a terminal device 102 (such as a smart phone, a tablet computer, a desktop computer, etc.), and a network 103. Although one image collecting device 101 and one terminal device 102 are illustrated in FIG. 1, the number of the devices is not limited. The image collecting device 101 and the terminal device 102 are coupled to each other and may transmit data to each other through the network 103.

Figure 2A:
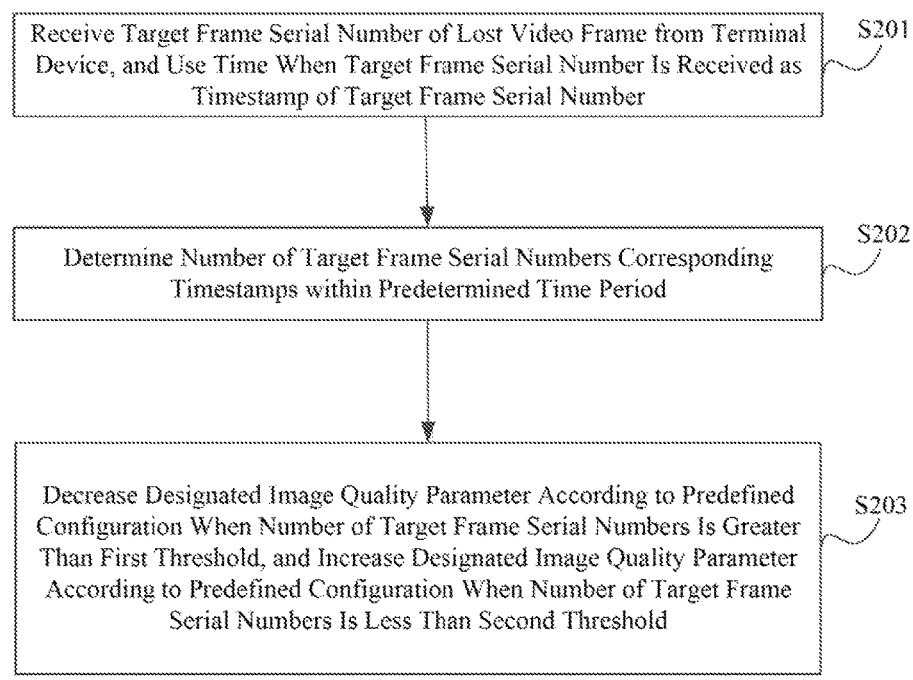
FIGS. 2A-2D are flowcharts illustrating methods for adjusting video quality based on a network environment, according to exemplary embodiments.

FIG. 2A is a flowchart illustrating a method 200 for adjusting video quality based on a network environment, according to an exemplary embodiment. For example, the method 200 may be performed in the image collecting device 101 (FIG. 1). The method 200 may enable that, in a poor network environment, the image collecting device 101 reduces an image definition of a video, such that the terminal device 102 may smoothly play the video in lower definition; and that in a good network environment, the image collecting device 101 increases the image definition of the video, such that the terminal device 102 may smoothly play the video in higher definition. Referring to FIGS. 1 and 2A, the method 200 may include the following steps executable by, for example, the image collecting device 101.

In step S201, the image collecting device 101 receives a target frame serial number of a lost video frame from the terminal device 102, and uses a time when the target frame serial number is received as a timestamp of the target frame serial number.

In step S202, the image collecting device 101 determines a number of target frame serial numbers corresponding to timestamps within a predefined time period.

In step S203, the image collecting device 101 decreases a designated image quality parameter according to a predefined configuration when the number of target frame serial numbers is greater than a first threshold, and increases the designated image quality parameter according to the predefined configuration when the number of target frame serial numbers is less than a second threshold, wherein the first threshold is greater than the second threshold.

Figure 2B:
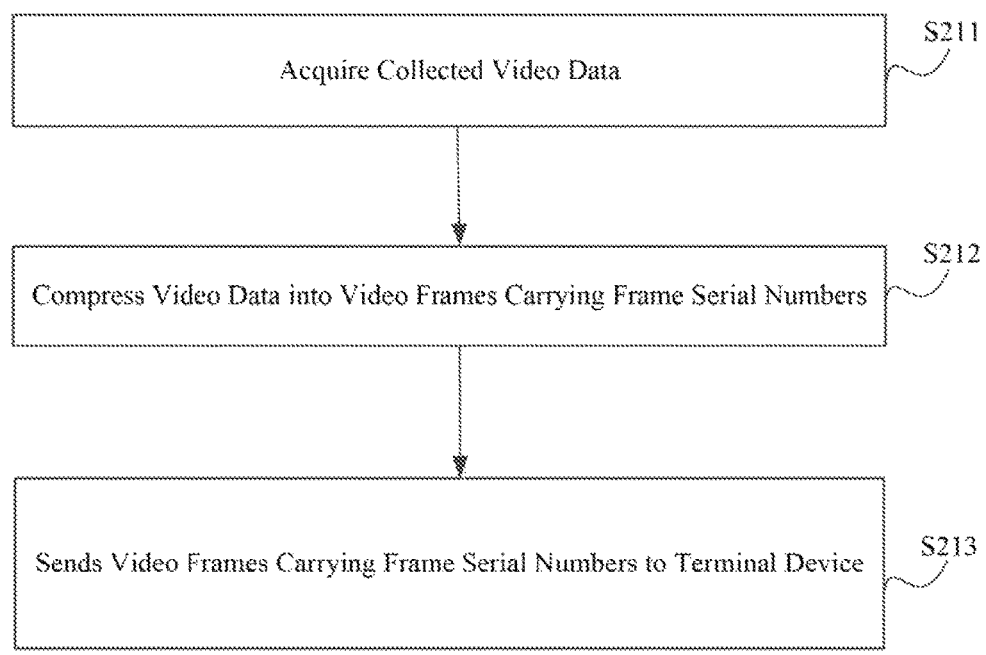

Referring to FIG. 2B, in one exemplary embodiment, the image collecting device 101 performs a method 210 including the following steps.

In step S211, the image collecting device 101 acquires collected video data.

In step S212, the image collecting device 101 compresses the video data into video frames carrying frame serial numbers by using a predefined video coding method according to a designated image quality parameter.

In step S213, the image collecting device 101 sends the video frames carrying the frame serial numbers to the terminal device 102.

Figure 2C:
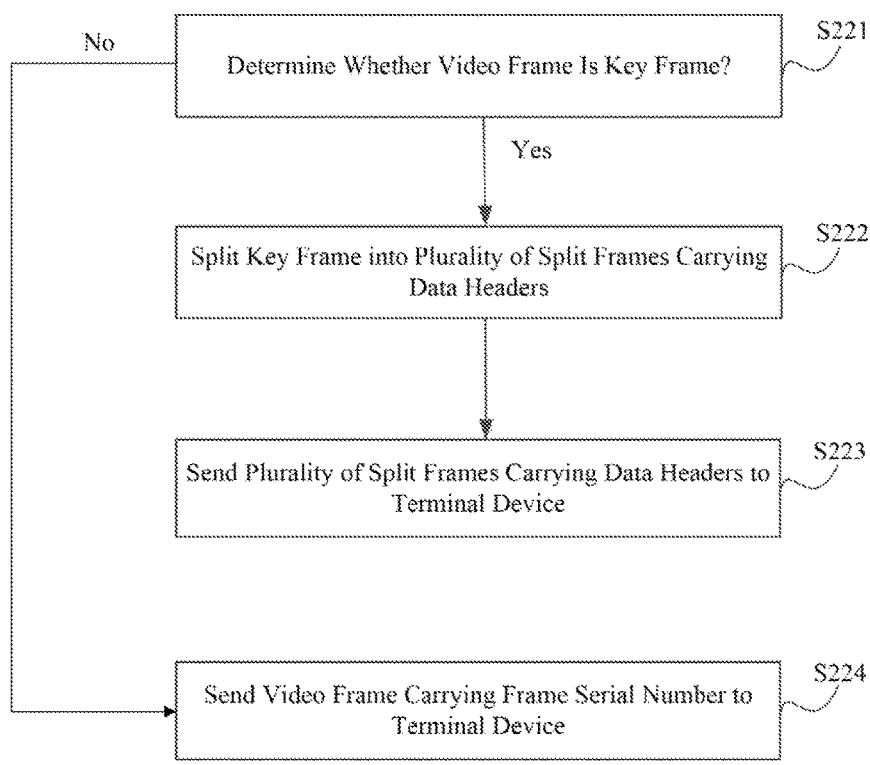

Referring to FIG. 2C, in one exemplary embodiment, prior to receiving the target frame serial number of the lost video frame from the terminal device 102 (step S201), the image collecting device 101 performs a method 220 including the following steps.

In step S221, the image collecting device 101 determines whether the video frame is a key frame.

If it is determined that the video frame is the key frame, in step S222, the image collecting device 101 splits the key frame into a plurality of split frames each carrying a data header according to a predefined splitting criterion. For example, the data header includes a frame serial number of the key frame, a split frame serial number of the split frame, and a total number of the plurality of split frames. In step S223, the image collecting device 101 sequentially sends the plurality of split frames carrying the data headers to the terminal device 102.

If it is determined that the video frame is not the key frame, in step S224, the image collecting device 101 sends the video frame carrying a frame serial number to the terminal device 102.

Figure 2D:
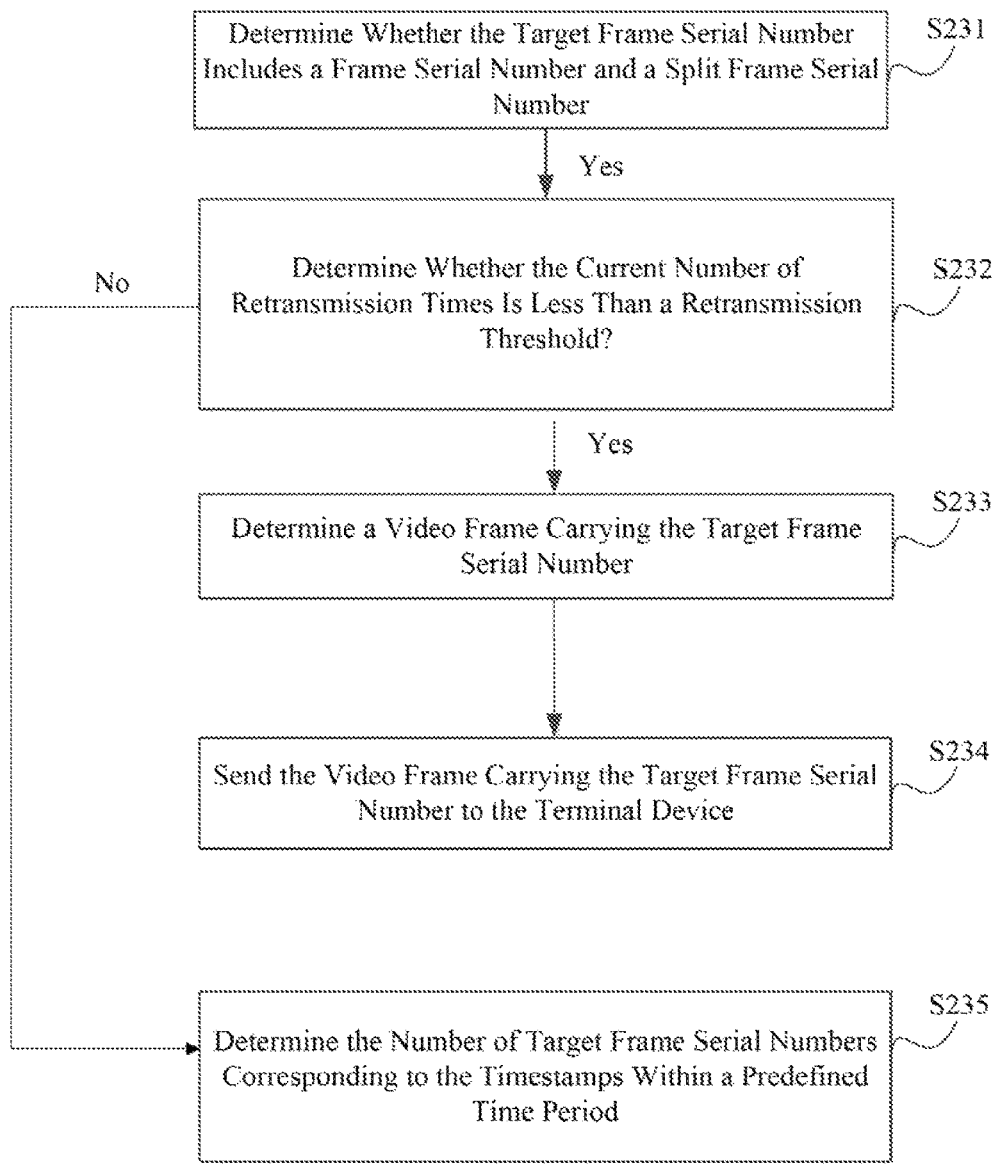

Referring to FIG. 2D, in one exemplary embodiment, to perform step S202 (FIG. 2A), the image collecting device 101 performs a method 230 including the following steps.

In step S231, the image collecting device 101 determines whether the target frame serial number includes a frame serial number and a split frame serial number.

In step S232, if it is determined that the target frame serial number includes a frame serial number and a split frame serial number, the image collecting device 101 further determines whether a current number of retransmission times corresponding to the target frame serial number is less than a retransmission threshold.

In step S233, if it is determined that the current number of retransmission times corresponding to the target frame serial number is less than the retransmission threshold, the image collecting device 101 determines a video frame carrying the target frame serial number.

In step S234, the image collecting device 101 sends the video frame carrying the target frame serial number to the terminal device 102, and progressively increases the current number of retransmission times by one.

If the current number of retransmission times corresponding to the target frame serial number is not less than the retransmission threshold, in step S235, the image collecting device 101 determines the number of target frame serial numbers corresponding to the timestamps within a predefined time period.

Figure 3A:
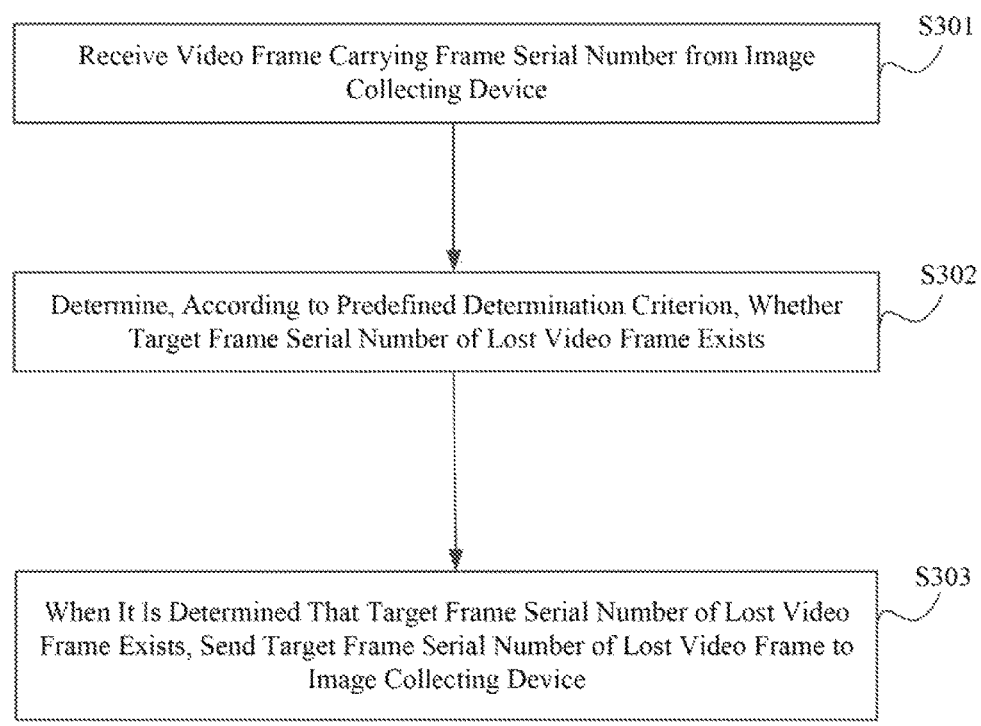
FIGS. 3A-3C are flowcharts illustrating methods for adjusting video quality based on a network environment, according to exemplary embodiments.

FIG. 3A is a flowchart of a method 300 for adjusting video quality based on a network environment, according to an exemplary embodiment. For example, the method 300 may be performed by the terminal device 102 (FIG. 1). Referring to FIGS. 1 and 3A, the method 300 includes the following steps.

In step S301, the terminal device 102 receives a video frame carrying a frame serial number from the image collecting device 101. For example, the video frame carrying the frame serial number is formed by compressing video data by the image collecting device 101 using a predefined video coding method according to a designated image quality parameter.

In step S302, the terminal device 102 determines, according to a predefined determination criterion, whether a target frame serial number of a lost video frame exists.

In step S303, if it is determined that a target frame serial number of a lost video frame exists, the terminal device 102 sends the target frame serial number of the lost video frame to the image collecting device 101. Accordingly, the image collecting device 101 may use the time when it receives the target frame serial number as a timestamp of the target frame serial number, and determine the number of target frame serial numbers corresponding to the timestamps within a predefined time period, to adjust the designated image quality parameter.

Figure 3B:
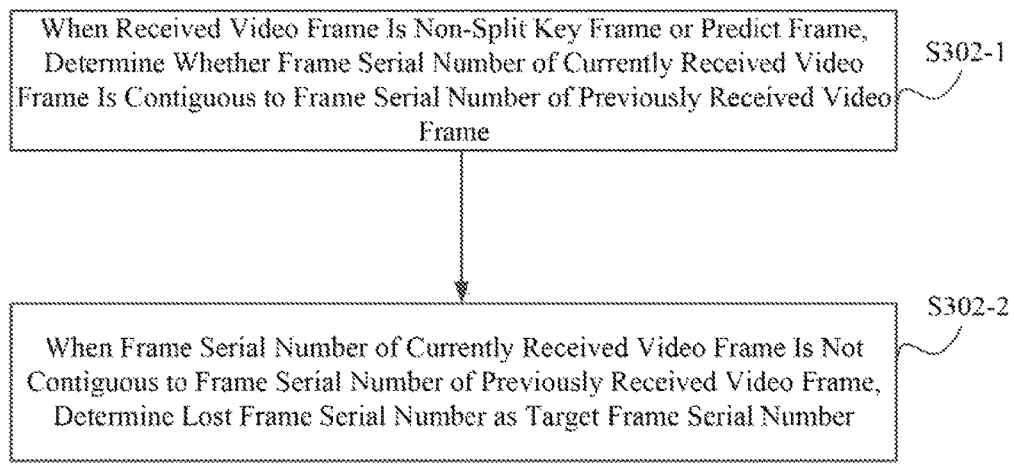

Referring to FIG. 3B, in one exemplary embodiment, step 302 further includes the following steps.

In step 302-1, when the received video frame is a non-split key frame or prediction frame, the terminal device 102 determines whether the frame serial number of the currently received video frame is contiguous to a frame serial number of a previously received video frame.

In step 302-2, when the frame serial number of the currently received video frame is not contiguous to a frame serial number of a previously received video frame, the terminal device 102 determines a lost frame serial number as the target frame serial number according to the frame serial number of the currently received video frame and the frame serial number of the previously received video frame.

Figure 3C:
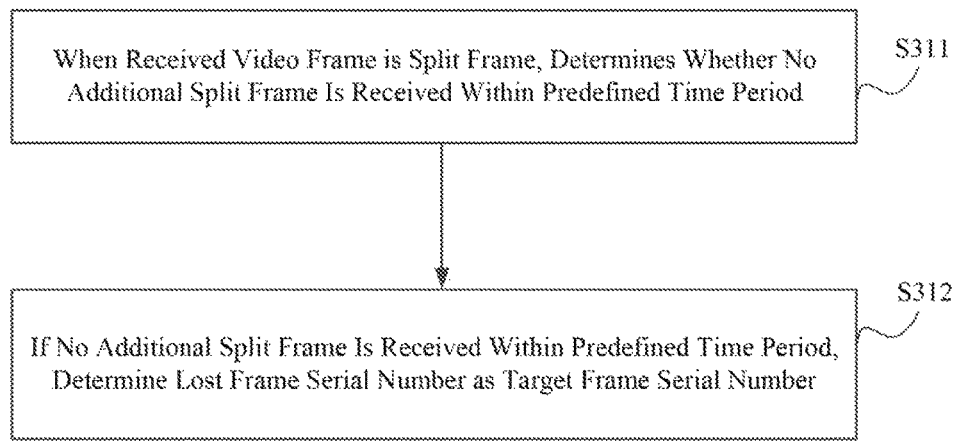

Referring to FIG. 3C, in one exemplary embodiment, the terminal device 102 performs a method 310 including the following steps.

In step 311, when the received video frame is a split frame, which is formed by splitting a key frame and carries a data header, the terminal device 102 determines whether no additional split frame is received within a predefined time period.

In step 312, if no additional split frame is received within the predefined time period, the terminal device 102 determines a lost frame serial number as the target frame serial number according to a frame serial number, a split frame serial number, and the total number of split frames carried in the data header of the split frame.

Figure 4A:
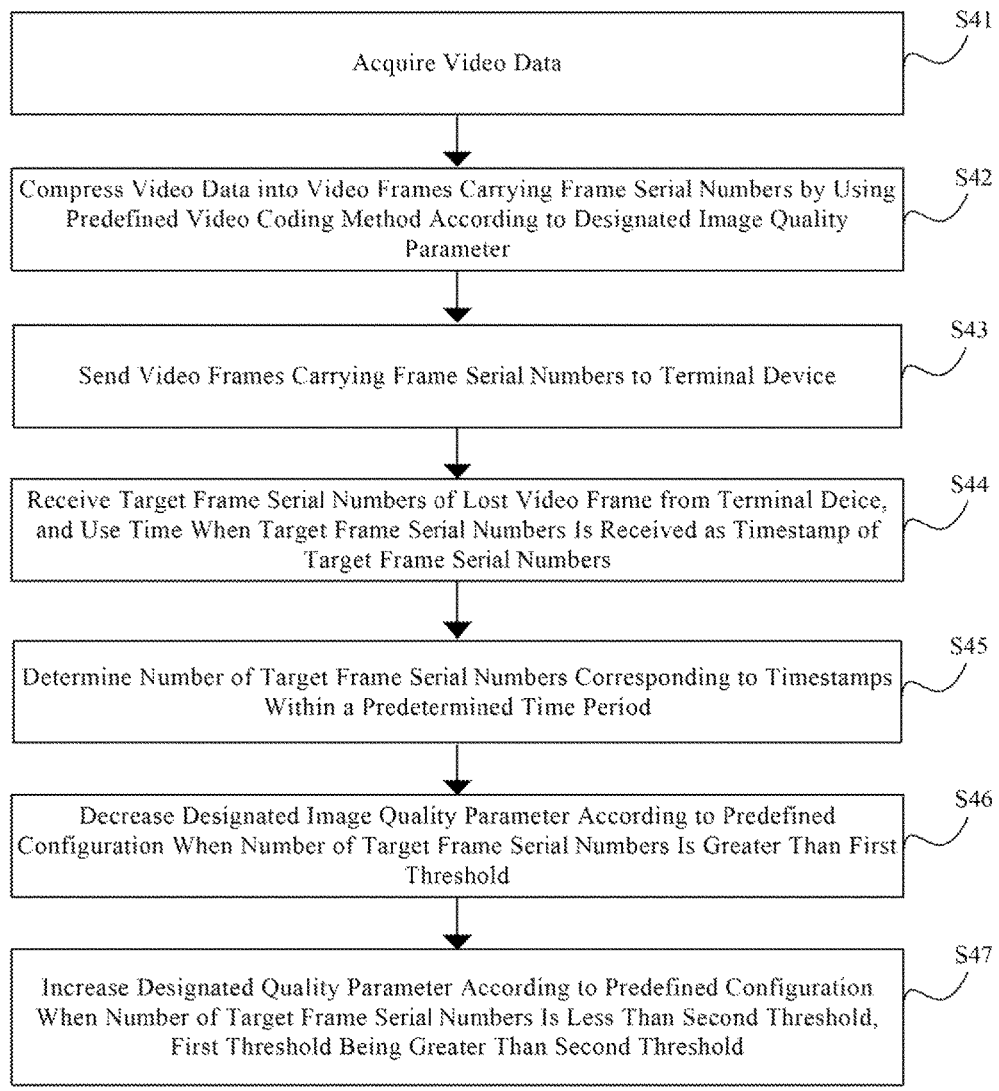
FIGS. 4A-4C are flowcharts illustrating methods for adjusting video quality based on a network environment, according to exemplary embodiments.

FIG. 4A is a flowchart of a method 400 for adjusting video quality based on a network environment, according to an exemplary embodiment. For example, the method 400 may be performed by the image collecting device 101 (FIG. 1). Referring to FIGS. 1 and 4A, the method 400 includes the following steps.

In step S41, the image collecting device 101 acquires video data. For example, the image collecting device 101 acquires the video data for subsequent use.

In step S42, the image collecting device 101 compresses the video data into video frames carrying frame serial numbers by using a predefined video coding method according to a designated image quality parameter.

In the exemplary embodiment, after the video data is acquired, the video data needs to be compressed by using a predefined video coding method according to a designated image quality parameter, to generate video frames carrying frame serial numbers. The predefined video coding method may be a coding standard such as H.262, H.263, or H.264, which is not limited in the present disclosure. The designated image quality parameter is a coding parameter of the predefined video coding method. For example, the higher the designated image quality parameter is, the higher the image quality of the video frames generated via coding is and the higher the definition of the video frames is. Also for example, the lower the designated image quality parameter is, the lower the image quality of the video frames generated via coding is and the lower the definition of the video frames is. The designated image quality parameter may be a parameter such as a video bit rate or definition. Each video frame has a unique frame serial number, and video frames are distinguished from each other via their frame serial numbers.

In step S43, the image collecting device 101 sends a video frame carrying a frame serial number to the terminal device 102.

In the exemplary embodiment, after generating the video frames carrying frame serial numbers, the image collecting device 101 sends the video frames carrying frame serial numbers to the terminal device 102.

In step S44, the image collecting device 101 receives a target frame serial number of a lost video frame from the terminal device 102, and uses a time when the target frame serial number is received as a timestamp of the target frame serial number.

In the exemplary embodiment, the image collecting device 101 sequentially sends video frames carrying frame serial numbers to the terminal device 102. If the terminal device 102 fails to receive a video frame within a certain time period, the terminal device 102 may consider that the video frame is lost. After determining the target frame serial number of the lost video frame, the terminal device 102 may send the target frame serial number of the lost video frame to the image collecting device 101, to inform the image collecting device 101 of the target frame serial number of the lost video frame. After receiving the target frame serial number of the lost video frame, the image collecting device 101 may use the time when the target frame serial number is received as the timestamp of the target frame serial number.

For example, if the target frame serial number of the lost video frame sent by the terminal device 102 is 1001 and the time when the image collecting device 101 receives the target frame serial number 1001 is 9:25':39", this time is used as the timestamp of the target frame serial number 1001. In some embodiments, to increase accuracy of determination in the subsequent steps, the receiving time to timestamp a target frame serial number may be measured by millisecond or microsecond.

In step S45, the image collecting device 101 determines a number of target frame serial numbers corresponding to timestamps received within a predefined time period.

In the exemplary embodiment, while the image collecting device 101 sequentially sends the video frames carrying frame serial numbers to the terminal device 102, the terminal device 102 may also send one or more lost target frame serial numbers to the image collecting device 101. The image collecting device 101 configures a timestamp for each target frame serial number. Therefore, the image collecting device 101 may determine the number of target frame serial numbers corresponding to the timestamps within a time period.

For example, the target frame serial numbers of the lost video frames received by the image collecting device 101 from the terminal device 102 are 1001, 1003, 1007, 1025, and 1056. The timestamp of the target frame serial number 1001 is 10:10':25"; the timestamp of the target frame serial number 1003 is 10:10':26"; the timestamp of the target frame serial number 1007 is 10:10':28"; the timestamp of the target frame serial number 1025 is 10:10':30"; and the timestamp of the target frame serial number 1056 is 10:10':31". If the image collecting device 101 needs to determine the number of target frame serial numbers between 10:10':26" and 10:10':30", it can find three target frame serial numbers present in this time period, and those three target frame serial numbers are 1003, 1007, and 1025.

In step S46, the image collecting device 101 decreases a designated image quality parameter according to a predefined configuration when the number of target frame serial numbers is greater than a first threshold.

In the exemplary embodiment, the image collecting device 101 may define two thresholds, i.e., the first threshold and a second threshold. If the number of target frame serial numbers is greater than the first threshold, it indicates that more video frames are lost within a unit time, and that the current network environment is poor. Therefore, the designated image quality parameter may be decreased such that, with the predefined video coding method, video frames with lower quality are generated from video data that is subsequently compressed and coded, to reduce the transmission rate of the image collecting device 101. Accordingly, the terminal device 102 may still smoothly play the video, thereby reducing freezing images of the video even in a poor network environment.

In step S47, the image collecting device 101 increases the designated image quality parameter according to the predefined configuration when the number of target frame serial numbers is less than the second threshold, wherein the first threshold is greater than the second threshold.

In the exemplary embodiment, if the number of target frame serial numbers is less than the second threshold, it indicates that fewer video frames are lost within a unit time, and that the current network environment is good. Therefore, the designated image quality parameter may be increased such that, with the predefined video coding method, video frames with higher quality are generated from video data that is subsequently compressed and coded, to increase the transmission rate of the image collecting device 101. Accordingly, the terminal device 102 may smoothly play the video with high definition, thereby preventing the image collecting device 101 from sending video images with lower quality to the terminal device 102 even in a good network environment, and avoiding waste of network bandwidth resources.

In the embodiment illustrated in FIG. 4A, it may be determined whether the current network environment is poor or good by determining the number of lost video frames of the terminal device 102 within a unit time. When it is determined that the number of target frame serial numbers is greater than the first threshold, it indicates that more video frames are lost within the unit time, and the current network environment is poor. Therefore, the designated image quality parameter may be decreased to reduce the transmission rate, such that the user can watch smooth video over the terminal device 102. When it is determined that the number of target frame serial numbers is less than the second threshold, it indicates that fewer video frames are lost within the unit time, and the current network environment is good. Therefore, the designated image quality parameter may be increased to increase the transmission rate, such that the user can watch the video with high definition over the terminal device 102. Therefore, the present disclosure may ensure that, in a poor network environment, the image collecting device 101 reduces the image definition of the video, such that the terminal device 102 may smoothly play the video with low definition; and that in a good network environment, the image collecting device 101 increases the image definition of the video, such that the terminal device 102 may smoothly play the video with high definition.

Figure 4B:
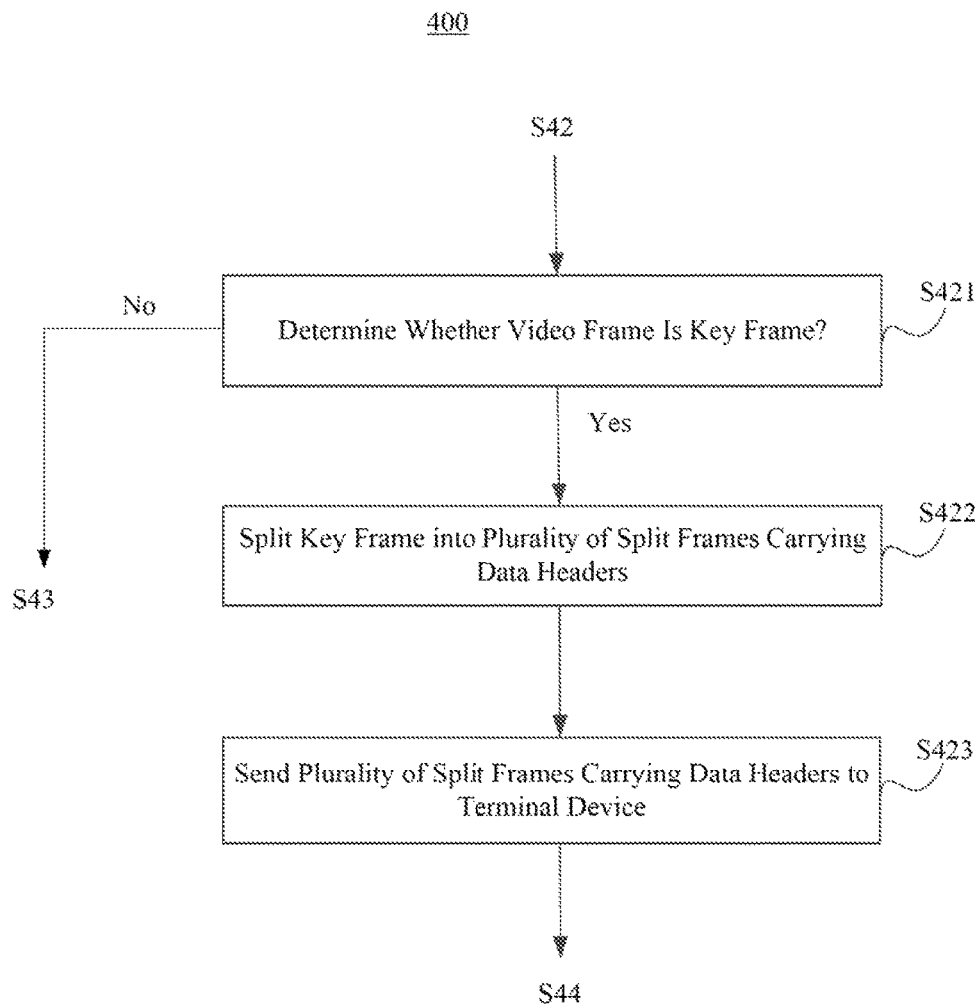

In one exemplary embodiment, after step S42 and prior to step S43, the method 400 may further include the following steps as shown in FIG. 4B. Referring to FIG. 4B, in step S421, the image collecting device 101 determines whether a video frame is a key frame. In step S422, when the video frame is the key frame, the image collecting device 101 splits the key frame into a plurality of split frames carrying data headers according to a predefined splitting criterion. A data header may include a frame serial number of the key frame, a split frame serial number of the split frame, and the total number of the plurality of split frames. In step S423, the image collecting device 101 sequentially sends the plurality of split frames carrying data headers to the terminal device 102, and performs step S44 without running through step S43. If it is determined that the video frame is not the key frame, the image collecting device 101 performs step S43.

Consistent with the embodiments of this disclosure, the method 400 may generate key frames and prediction frames after video data is compressed by using a predefined video coding method. For example, a key frame may be referred to as an I frame and a prediction frame may be referred to as a P frame. Since I frame may have a large amount of data, and is an independent frame not associated with previous and next data frames, displaying the I frame may not be affected even if a previous frame is lost or has an error. The decoding can be implemented with only I frame. A P frame is a prediction frame, which indicates a difference between this frame and a previous I frame or P frame. During the decoding, the previously cached image data needs to be superposed with the difference defined by the current frame. Therefore, a P frame is greatly associated with a previous frame and has a small amount of data. If a previous frame is lost or has an error, displaying the P frame may be affected, but displaying other frames may not be affected. When it is determined that the video frame is a key frame, to prevent the key frame from being completely lost during transmission, the key frame may be split into a plurality of split frames carrying data headers according to a predefined splitting criterion. As such, one key frame is split into a plurality of split frames, and each of the split frames carries a data header, which includes a frame serial number of the key frame, a split frame serial number of the split frame, and the total number of split frames. The terminal device 102 may determine, according to the data in the data headers, which split frame in the key frame is lost. Afterwards, the terminal device 102 may send the split frame serial number of the lost split frame and the frame serial number of the key frame to the image collecting device 101, such that the image collecting device 101 can search for the corresponding split frame according to the split frame serial number and the frame serial number, and re-send the lost split frame to the terminal device 102. Accordingly, a lost key frame may be found.

Figure 5:
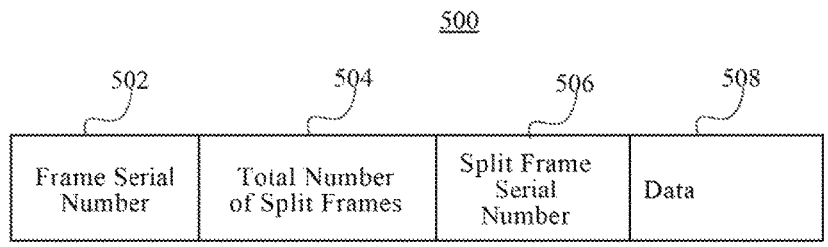
FIG. 5 is a structural diagram illustrating a split frame, according to an exemplary embodiment.

FIG. 5 shows a structural diagram of a split frame 500, according to an exemplary embodiment. The split frame 500 includes a frame serial number 502 of a key frame, a total number 504 of split frames, a split frame serial number 506 of the split frame 500, and a data field 508. The frame serial number 502, the total number 504 of the split frames, and the split frame serial number 506 form a data header in the present embodiment.

In exemplary embodiments, the predefined splitting criterion may include making the size of each split frame obtained by splitting the key frame less than a maximum transmission unit in the current network environment. For example, if the maximum transmission unit in the current network environment is 1500 bytes, then the size of each of the split frames may be set to 1024 bytes, or to 1040 bytes, or to 900 bytes. In short, the size of each split frame is less than the maximum transmission unit, i.e., 1500 bytes.

As another example, if the image collecting device 101 has determined that the current video frame to be sent is a key frame, the frame serial number of the key frame is 101, the size of the key frame is 5000 bytes, and the maximum transmission unit in the current network environment is 1500 bytes, the image collecting device 101 may set the size of each split frame to 1000 bytes through a predetermined setting. The image collecting device 101 may split the key frame having frame serial number 101 into five split frames, each having a size of 1000 bytes, and each of these five split frames has a data header. The data header of the first split frame may include the frame serial number 101, the split frame serial number 1001 of the split frame, and the total number 5 of split frames. The data header of the second split frame may include the frame serial number 101, the split frame serial number 1002 of the split frame, and the total number 5 of split frames. The data header of the third split frame may include the frame serial number 101, the split frame serial number 1003 of the split frame, and the total number 5 of split frames. The data header of the fourth split frame may include the frame serial number 101, the split frame serial number 1004 of the split frame, and the total number 5 of split frames. The data header of the fifth split frame may include the frame serial number 101, the split frame serial number 1005 of the split frame, and the total number 5 of split frames. After the splitting, those five split frames carrying data headers are sequentially transmitted to the terminal device 102.

Figure 4C:
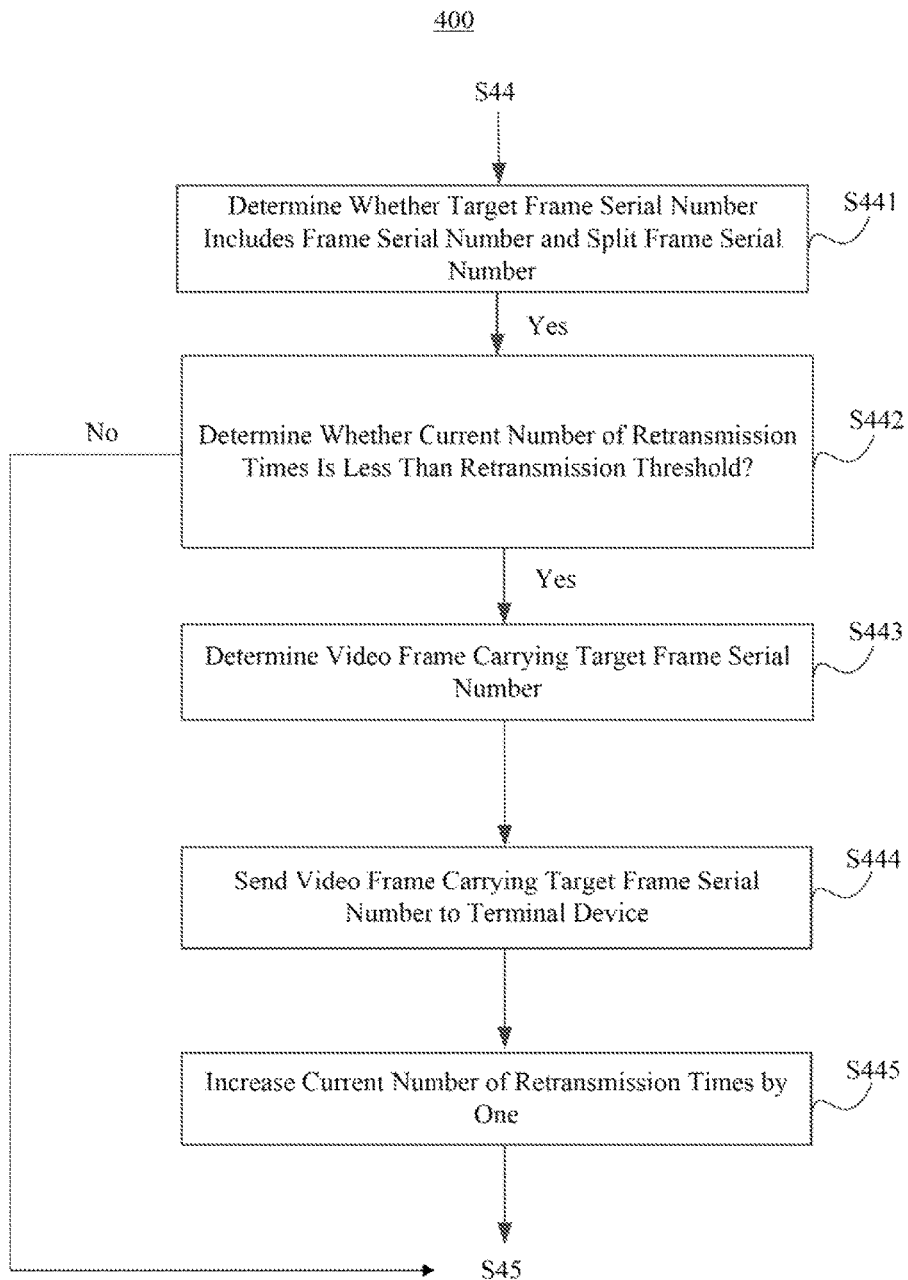

In one exemplary embodiment, after step S44, the method 400 may further include the following steps as shown in FIG. 4C. Referring to FIG. 4C, in step S441, the image collecting device 101 determines whether the target frame serial number includes a frame serial number and a split frame serial number. If so, in step S442, the image collecting device 101 determines whether the current number of retransmission times corresponding to the target frame serial number is less than a retransmission threshold. If yes, in step S443, the image collecting device 101 determines a video frame carrying the target frame serial number. In step S444, the image collecting device 101 sends the video frame carrying the target frame serial number to the terminal device 102. In step S445, the image collecting device 101 increases the current number of retransmission times by one, and performs step S45. If the current number of retransmission times corresponding to the target frame serial number is not less than the retransmission threshold (S442—No), the image collecting device 101 performs step S45 in FIG. 4A.

As described in the above embodiment, when the image collecting device 101 determines that the data frame is a key frame, the key frame may be split into a plurality of split frames carrying data headers. If the target frame serial number received by the image collecting device 101 from the terminal device 102 includes a frame serial number and a split frame serial number, and the current number of retransmission times corresponding to the target frame serial number is less than a retransmission threshold, it indicates that the terminal device 102 has lost a split frame, and that the image collecting device 101 needs to re-send the split frame once more. In this case, the image collecting device 101 needs to determine whether the target frame serial number sent by the terminal device 102 includes the frame serial number and the split frame serial number. If the target frame serial number includes the frame serial number and the split frame serial number, it indicates that the target frame serial number corresponds to a split frame. In addition, the image collecting device 101 needs to determine the current number of retransmission times corresponding to the frame serial number and the split frame serial number. If the current number of retransmission times is less than the retransmission threshold, the image collecting device 101 may determine the video frame carrying the target frame serial number, send the video frame carrying the target frame serial number to the terminal device 102, and increase the current number of retransmission times by one. This would allow the terminal device 102 to play the key frame. If the current number of retransmission times is not less than the retransmission threshold, it indicates that the image collecting device 101 has sent the split frame to the terminal device 102 for multiple times, and the retransmission times has reached an upper limit. Therefore, even if the terminal device 102 has lost the split frame, the image collecting device 101 may not constantly send the split frame to the terminal device 102. In this case, the image collecting device 101 may not send the lost split frame to the terminal device 102.

For example, if the image collecting device 101 has determined that the video frame which is currently to be sent is a key frame, the frame serial number of the key frame is 101, the size of the key frame is 5000 bytes, and the maximum transmission unit in the current network environment is 1500 bytes, the image collecting device 101 may set the size of each split frame to 1000 bytes through a predetermined setting. The image collecting device 101 may split the key frame carrying frame serial number 101 into five split frames, each having a size of 1000 bytes. Each of these five split frames has a data header. The data header of the first split frame may include the frame serial number 101, the split frame serial number 1001 of the split frame, and the total number 5 of split frames. The data header of the second split frame may include the frame serial number 101, the split frame serial number 1002 of the split frame, and the total number 5 of split frames. The data header of the third split frame may include the frame serial number 101, the split frame serial number 1003 of the split frame, and the total number 5 of split frames. The data header of the fourth split frame may include the frame serial number 101, the split frame serial number 1004 of the split frame, and the total number 5 of split frames. The data header of the fifth split frame may include the frame serial number 101, the split frame serial number 1005 of the split frame, and the total number 5 of split frames. After the splitting, those five split frames carrying data headers are sequentially transmitted to the terminal device 102. In this case, the image collecting device 101 receives the target frame serial number of a lost video frame from the terminal device 102, and determines that the target frame serial number includes the frame serial number 101 and the split frame serial number 1003. In addition, the image collecting device 101 determines that the current number of retransmission times corresponding to the frame serial number 101 and the split frame serial number 1003 is 1, which is less than the retransmission threshold 3. Therefore, the image collecting device 101 may determine the video frame carrying the frame serial number 101 and the split frame serial number 1003, and send the video frame carrying the frame serial number 101 and the split frame serial number 1003 to the terminal device 102. The image collecting device 101 increases the current number of retransmission times by one. As such, the current number of retransmission times corresponding to the frame serial number 101 and the split frame serial number 1003 is 2.

When the target frame serial number includes only a frame serial number, it indicates that the frame serial number may be a non-split key frame or a non-split prediction frame. When the current number of retransmission times corresponding to the target frame serial number is less than the retransmission threshold, and the terminal device 102 has lost the non-split key frame or the non-split prediction frame, the image collecting device 101 may re-send the non-split key frame or prediction frame once more. In this case, the image collecting device 101 may determine whether the target frame serial number sent by the terminal device 102 includes only the frame serial number. If the target frame serial number includes only the frame serial number, it indicates that the target frame serial number corresponds to a non-split key frame or a non-split prediction frame. In addition, the image collecting device 101 needs to determine the current number of retransmission times corresponding to the frame serial number. If the current number of retransmission times is less than the retransmission threshold, the image collecting device 101 may find the video frame carrying the frame serial number and send the video frame carrying the frame serial number to the terminal device 102. The image collecting device 101 increases the current number of retransmission times by one. This enables the terminal device 102 to play the non-split key frame or the non-split prediction frame that was previously lost. If the current number of retransmission times is not less than the retransmission threshold, it indicates that the image collecting device 101 has sent the non-split key frame or the non-split prediction frame to the terminal device 102 for multiple times, and the number of retransmission times has reached an upper limit. Therefore, even if the terminal device 102 has lost the non-split key frame or prediction frame, the image collecting device 101 may not constantly send the non-split key frame or prediction frame to the terminal device 102. In this case, the image collecting device 101 may not send the lost non-split key frame or the non-split prediction frame to the terminal device 102.

Figure 6:
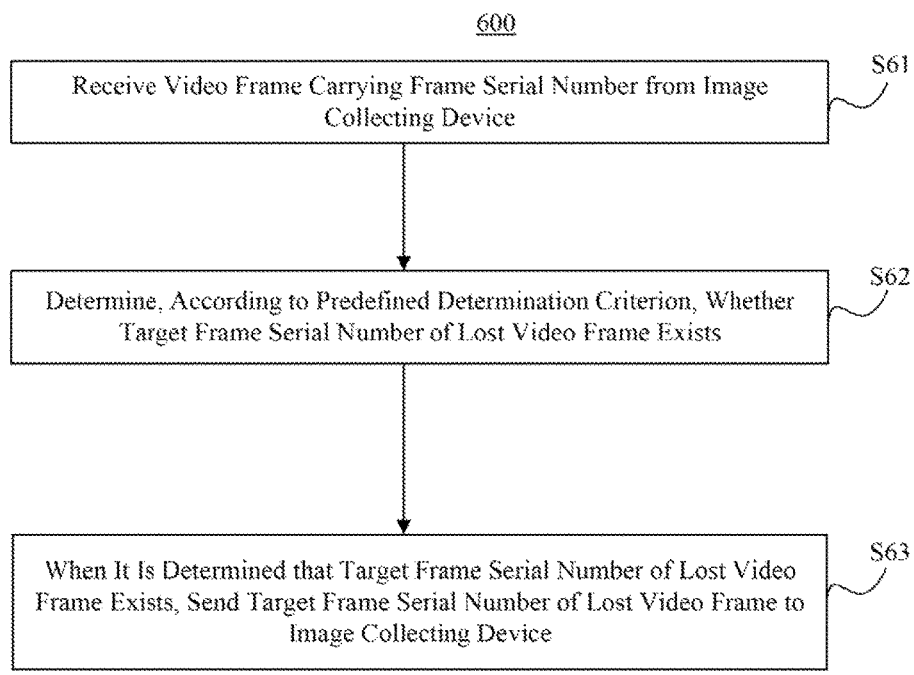
FIG. 6 is a flowchart illustrating a method for adjusting video quality based on a network environment, according to an exemplary embodiment.

FIG. 6 is a flowchart illustrating a method 600 for adjusting video quality based on a network environment, according to an exemplary embodiment. For example, the method 600 may be performed by a mobile phone configured to communicate with the image collecting device 101 (FIG. 1). The method 600 may ensure that in a poor network environment, the image collecting device 101 decreases an image definition of a video, such that the mobile phone may smoothly play the video with lower definition. In a good network environment, the image collecting device 101 may increase the image definition of the video, such that the mobile phone may smoothly play the video with higher definition. Referring to FIGS. 1 and 6, the method 600 may include the following steps.

In step S61, the mobile phone receives a video frame carrying a frame serial number from the image collecting device 101. For example, the video frame carrying a frame serial number is formed by compressing video data by the image collecting device 101 using a predefined video coding method according to a designated image quality parameter.

Similar to the above description, the image collecting device 101 may compress the collected video data into video frames carrying frame serial numbers by using a predefined video coding method according to a designated image quality parameter, and send the video frames carrying frame serial numbers to the mobile phone. The mobile phone may receive the video frames carrying frame serial numbers from the image collecting device 101 through the transmission over the network.

In step S62, the mobile phone determines, according to a predefined determination criterion, whether a target frame serial number of a lost video frame exists.

The predefined determination criterion is not limited in the present disclosure. When the video frame received by the mobile phone is a non-split key frame or prediction frame, the mobile phone may determine whether the frame serial number of the currently received video frame is contiguous to the frame serial number of a previously received video frame. If the frame serial numbers are contiguous, it indicates that no video frame is lost between the currently received video frame and the previously received video frame. If the frame serial numbers are non-contiguous, the lost frame serial number may be determined according to the frame serial number of the currently received video frame and the frame serial number of the previously received video frame. The lost frame serial number may be referred to as the target frame serial number. For example, if the video frame received by the mobile phone is a non-split key frame or prediction frame, the frame serial number of the currently received video frame is 106, and the frame serial number of the previously received video frame is 105, then the mobile phone may determine that the frame serial numbers of the received video frames are contiguous, and that no video frame is lost. As another example, if the video frame received by the mobile phone is a non-split key frame or prediction frame, the frame serial number of the currently received video frame is 106, and the frame serial number of the previously received video frame is 104, then the mobile phone may determine that the frame serial numbers of the received video frames are non-contiguous. In this case, the mobile phone may determine that the lost frame serial number is 105 according to the frame serial number 106 of the currently received video frame and the frame serial number 104 of the previously received video frame. The lost frame serial number 105 is referred to as the target frame serial number 105. The mobile phone informs the image collecting device 101 of the target frame serial number 105.

If the video frames received by the mobile phone are split frames obtained by splitting the key frames, upon receiving a series of split frames, the mobile phone may determine whether no additional split frame is received within a predefined time period. If no additional split frame is received, the mobile phone may query the data headers of this series of split frames, and determine whether the number of received split frames is the same as the total number of split frames in the data headers. If they are the same, the mobile phone may determine that no split frame in this series of split frames is lost. If they are different, the mobile phone may determine that one or more split frame in this series of split frames are lost, and determine which split frame is lost according to the split frame serial number in the data header of each split frame. When the split frame serial number of the lost split frame is determined, the mobile phone may use the frame serial number in the data header and the lost split frame serial number as the target frame serial number, and then send the target frame serial number to the image collecting device 101.

In step S63, when the mobile phone determines, according to the predefined determination criterion, that a target frame serial number of a lost video frame exists, it sends the target frame serial number of the lost video frame to the image collecting device 101. The image collecting device 101 may use the time when the target frame serial number is received as a timestamp of the target frame serial number, and determine the number of target frame serial numbers corresponding to the timestamps within a predefined time period. A designated image quality parameter is decreased according to a predefined configuration when the image collecting device 101 determines that the number of target frame serial numbers is greater than a first threshold. The designated image quality parameter is increased according to the predefined configuration when the image collecting device 101 determines that the number of target frame serial numbers is less than a second threshold, wherein the first threshold is greater than the second threshold.

Figure 7:
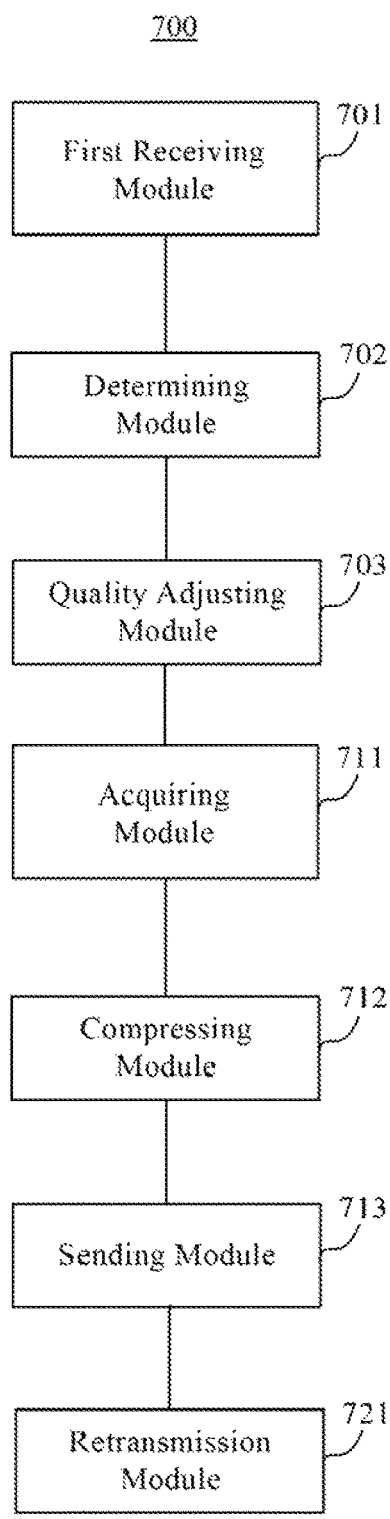
FIG. 7 is a block diagram illustrating an apparatus for adjusting video quality based on a network environment, according to an exemplary embodiment.

FIG. 7 is a block diagram illustrating an apparatus 700 for adjusting video quality based on a network environment, according to an exemplary embodiment. For example, the apparatus 700 may be a part of the image collecting device 101 (FIG. 1) or the whole image collecting device 101.

Referring to FIG. 7, the apparatus 700 includes a first receiving module 701 configured to receive a target frame serial number of a lost video frame from a terminal device, and use the time when the target frame serial number is received as a timestamp of the target frame serial number, a determining module 702 configured to determine a number of target frame serial numbers corresponding to the timestamps within a predefined time period, and a quality adjusting module 703 configured to decrease a designated image quality parameter according to a predefined configuration when the number of target frame serial numbers is greater than a first threshold, and to increase the designated image quality parameter according to the predefined configuration when the number of target frame serial numbers is less than a second threshold, the first threshold being greater than the second threshold.

In one exemplary embodiment, the apparatus 700 may further include an acquiring module 711, configured to acquire collected video data; a compressing module 712, configured to compress the video data into video frames carrying frame serial numbers by using a predefined video coding method according to the designated image quality parameter; and a sending module 713, configured to send the video frames carrying frame serial numbers to the terminal device.

In one exemplary embodiment, the apparatus 700 further includes a judging module (not shown), configured to judge whether the video frame is a key frame; and an executing module (not shown) configured to, when the video frame is the key frame, split the key frame into a plurality of split frames carrying data headers according to a predefined splitting criterion. The data header includes a frame serial number of the key frame, a split frame serial number of the split frame, and the total number of the plurality of split frames. The sending module 713 may sequentially send the plurality of split frames carrying data headers to the terminal device. When the video frame is not a key frame, the sending module may send the video frame carrying the frame serial number to the terminal device.

In one exemplary embodiment, the apparatus 700 further includes a retransmission control module 721 configured to, when the target frame serial number includes a frame serial number and a split frame serial number and the current number of retransmission times corresponding to the target frame serial number is less than a retransmission threshold, determine a video frame carrying the target frame serial number, send the video frame carrying the target frame serial number to the terminal device, and progressively increase the current number of retransmission times by one. When the target frame serial number includes the frame serial number and the split frame serial number and the current number of retransmission times corresponding to the target frame serial number is not less than the retransmission threshold, the retransmission control module 721 retransmits the video frame.

Figure 8A:
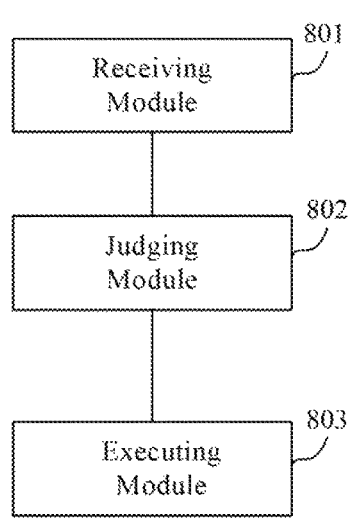
FIGS. 8A-8B are block diagrams illustrating apparatuses for adjusting video quality based on a network environment, according to exemplary embodiments.

FIG. 8A is a block diagram illustrating an apparatus 800 for adjusting video quality based on a network environment, according to an exemplary embodiment. For example, the apparatus 800 may be a part of the terminal device 102 (FIG. 1) or the whole terminal device 102. Referring to FIG. 8A, the apparatus 800 includes a receiving module 801, a judging module 802, and an executing module 803.

The receiving module 801 is configured to receive a video frame carrying a frame serial number from an image collecting device. The video frame carrying a frame serial number is formed by the image collecting device compressing video data using a predefined video coding method according to a designated image quality parameter.

The judging module 802 is configured to determine, according to a predefined determination criterion, whether a target frame serial number of a lost video frame exists.

The executing module 803 is configured to, when it is determined, according to the predefined judgment criterion, that a target frame serial number of a lost video frame exists, send the target frame serial number of the lost video frame to the image collecting device. Accordingly, the image collecting device may use the time when the target frame serial number is received as a timestamp of the target frame serial number, and determine the number of target frame serial numbers corresponding to the timestamps within a predefined time period. The image collecting device decreases a designated image quality parameter according to a predefined configuration when the image collecting device determines that the number of target frame serial numbers is greater than a first threshold, or increases the designated image quality parameter according to the predefined configuration when the image collecting device determines that the number of target frame serial numbers is less than a second threshold, the first threshold being greater than the second threshold.

Figure 8B:
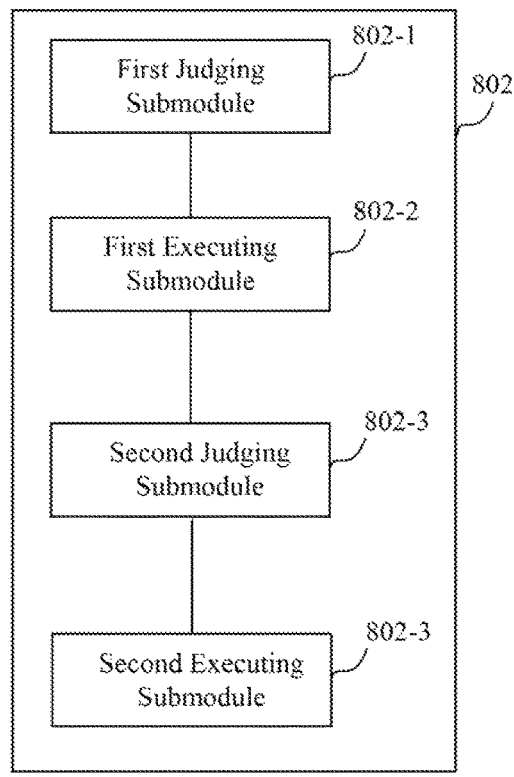

FIG. 8B is a block diagram illustrating the judging module 802 (FIG. 8A), according to an exemplary embodiment. Referring to FIG. 8B, the judging module 802 may include: a first judging submodule 802-1 configured to, when the received video frame is a non-split key frame or prediction frame, determine whether the frame serial number of the currently received video frame is contiguous to a frame serial number of a previously received video frame; and a first executing submodule 802-2 configured to, when the frame serial number of the currently received video frame is not contiguous to a frame serial number of a previously received video frame, determine a lost frame serial number as the target frame serial number according to the frame serial number of the currently received video frame and the frame serial number of the previously received video frame.

In one exemplary embodiment, the judging module 802 may further include: a second judging submodule 802-3 configured to, when the received video frame is a split frame which is split from a key frame and carries a data header, determine whether no additional split frame is received within a predefined time period; and a second executing submodule 802-4 configured to, if no additional split frame is received within the predefined time period, determine a lost frame serial number as the target frame serial number according to a frame serial number, a split frame serial number and the total number of split frames carried in the data header of the split frame.

Figure 9:
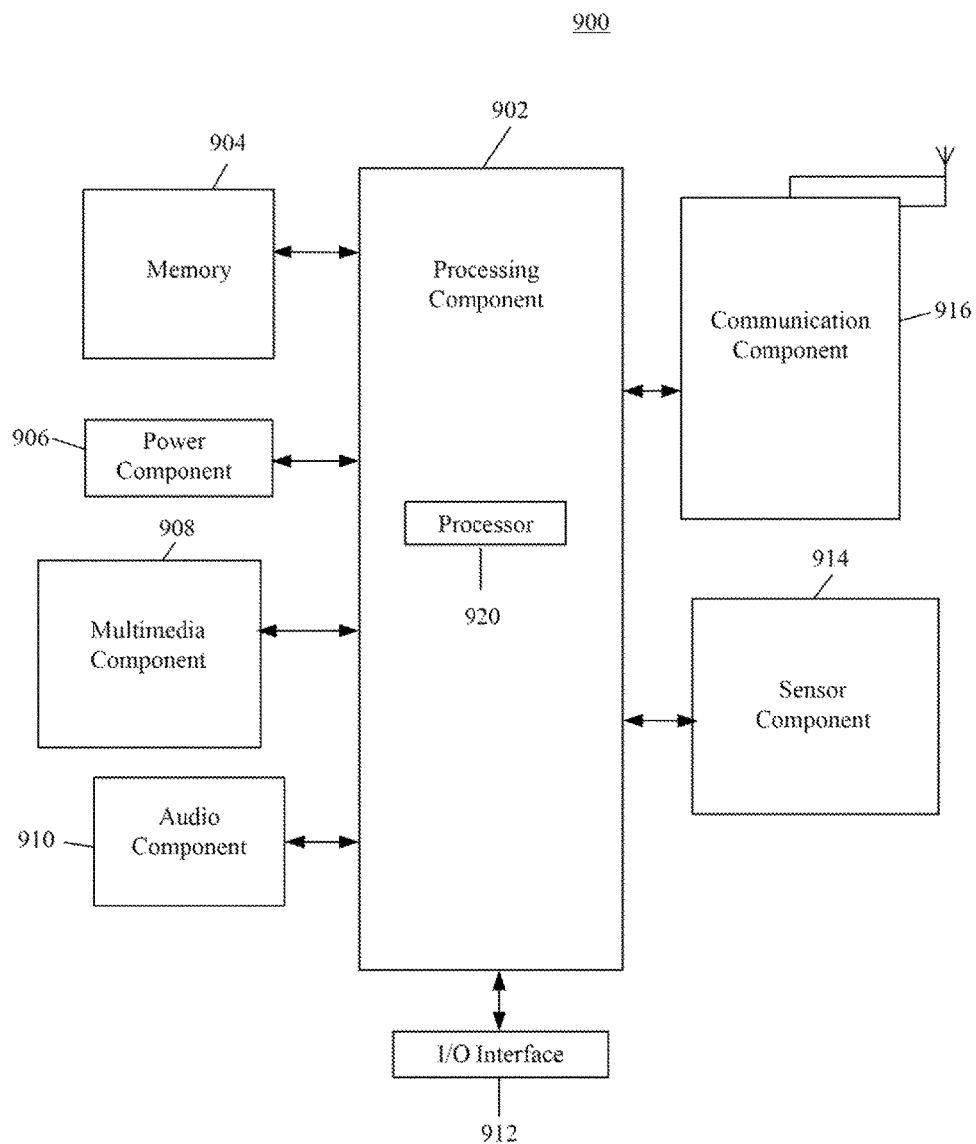
FIG. 9 is a block diagram illustrating an apparatus for adjusting video quality based on a network environment, according to an exemplary embodiment.

FIG. 9 is a block diagram illustrating an apparatus 900 for adjusting video quality based on a network environment, according to an exemplary embodiment. For example, the apparatus 900 may be the terminal device 102 (FIG. 1), such as a mobile phone, a computer, a digital broadcast terminal, a messaging device, a gaming console, a tablet, a medical device, exercise equipment, a personal digital assistant, and the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or a part of the steps in the above-described methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operations of the apparatus 900. Examples of such data include instructions for any application or method operated on the apparatus 900, contact data, phonebook data, messages, pictures, videos, and the like. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power supplies, and other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the apparatus 900 is in an operation mode, such as a call mode, a recording mode, or a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and a peripheral interface module, such as a keyboard, a click wheel, a button, or the like. The buttons may include, but are not limited to, a home button, a volume button, a starting button, and a locking button.

The sensor component 914 includes one or more sensors to provide status assessments of various aspects of the apparatus 900. For example, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communications, wired or wirelessly, between the apparatus 900 and other devices. The apparatus 900 may access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 904, executable by the processor 920 in the apparatus 900, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 10:
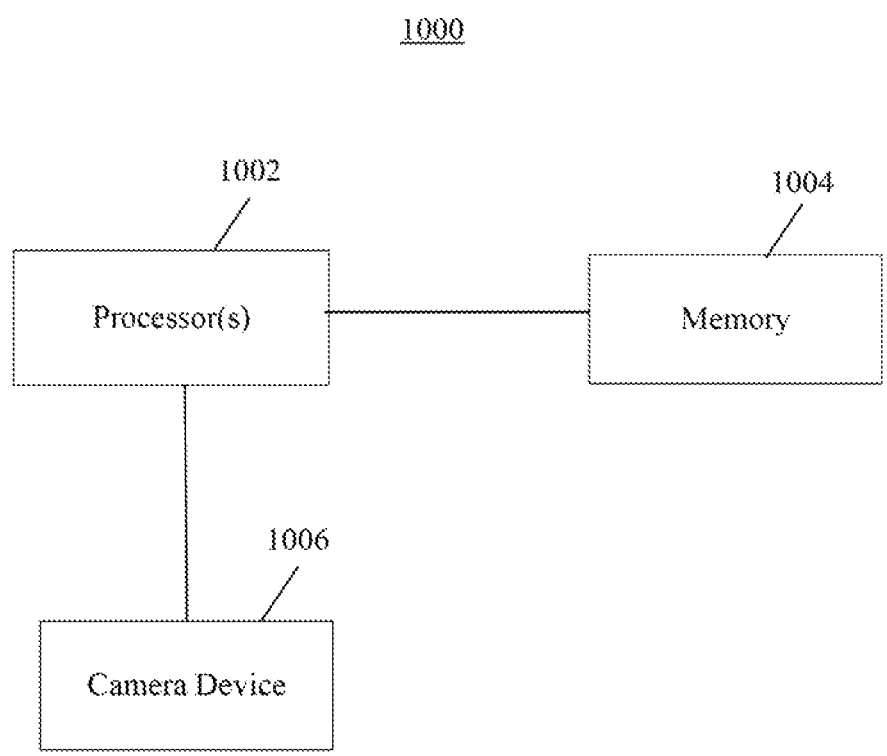
FIG. 10 is a block diagram illustrating an apparatus for adjusting video quality based on a network environment, according to an exemplary embodiment.

FIG. 10 is a block diagram illustrating an apparatus 1000 for adjusting video quality based on a network environment, according to an exemplary embodiment. For example, the apparatus 1000 may be the image collecting device 101 (FIG. 1). Referring to FIG. 10, the apparatus 1000 includes one or more processors 1002 configured to execute instructions to perform the above described methods, memory resources represented by a memory 1004, for storing the instructions and otherwise facilitating operation of the processor 1002, and a camera device 1006 for collecting images.

In exemplary embodiments, there is also provided a non-transitory computer-readable storage medium including instructions, such as included in the memory 1004, executable by the processor(s) 1002 in the apparatus 1000, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

One of ordinary skill in the art will understand that the above described modules and submodules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for adjusting video quality based on a network environment, comprising:
   determining whether a video frame is a key frame;
   if it is determined that the video frame is the key frame, splitting the key frame into a plurality of split frames each carrying a data header according to a predefined splitting criterion, the data header including a frame serial number of the key frame, a split frame serial number of the split frame, and a total number of split frames, and sequentially sending the plurality of split frames to a terminal device;
   if it is determined that the video frame is not the key frame, sending the video frame carrying a frame serial number to the terminal device;
   receiving a target frame serial number of a lost video frame from the terminal device, and using a time when the target frame serial number is received as a timestamp of the target frame serial number;
   determining a number of target frame serial numbers corresponding to timestamps within a predefined time period;
   decreasing a designated image quality parameter according to a predefined configuration when the number of target frame serial numbers is greater than a first threshold; and
   increasing the designated image quality parameter according to the predefined configuration when the number of target frame serial numbers is less than a second threshold, the first threshold being greater than the second threshold.

2. The method according to claim 1, further comprising:
   acquiring video data;
   compressing the video data into video frames carrying frame serial numbers by using a predefined video coding method according to the designated image quality parameter; and
   sending the video frames carrying the frame serial numbers to the terminal device.

3. The method according to claim 1, further comprising:
   when the target frame serial number includes a frame serial number and a split frame serial number, and a number of retransmission times corresponding to the target frame serial number is less than a retransmission threshold, determining a video frame carrying the target frame serial number;
   sending the video frame carrying the target frame serial number to the terminal device, and progressively increasing the number of retransmission times by one; and
   when the target frame serial number includes the frame serial number and the split frame serial number, and the number of retransmission times corresponding to the target frame serial number is not less than the retransmission threshold, performing the determining of the number of target frame serial numbers corresponding to the timestamps within the predefined time period.

4. An apparatus for adjusting video quality based on a network environment, comprising:
   one or more processors; and
   a memory for storing instructions executable by the one or more processors;
   wherein the one or more processors are configured to perform:
   determining whether a video frame is a key frame;
   if it is determined that the video frame is the key frame, splitting the key frame into a plurality of split frames each carrying a data header according to a predefined splitting criterion, the data header including a frame serial number of the key frame, a split frame serial number of the split frame, and a total number of the plurality of split frames; and sequentially sending the plurality of split frames to a terminal device;
   if it is determined that the video frame is not the key frame, sending the video frame carrying a frame serial number to the terminal device;
   receiving a target frame serial number of a lost video frame from the terminal device, and using a time when the target frame serial number is received as a timestamp of the target frame serial number;
   determining a number of target frame serial numbers corresponding to timestamps within a predefined time period;

decreasing a designated image quality parameter according to a predefined configuration when the number of target frame serial numbers is greater than a first threshold; and increasing the designated image quality parameter according to the predefined configuration when the number of target frame serial numbers is less than a second threshold, the first threshold being greater than the second threshold.

5. The apparatus according to claim 4, wherein the one or more processors are further configured to perform:

acquiring video data;

compressing the video data into video frames carrying frame serial numbers by using a predefined video coding method according to the designated image quality parameter; and sending the video frames carrying frame serial numbers to the terminal device.

6. The apparatus according to claim 4, wherein the one or more processors are further configured to perform:

when the target frame serial number includes a frame serial number and a split frame serial number, and a number of retransmission times corresponding to the target frame serial number is less than a retransmission threshold, determining a video frame carrying the target frame serial number;

sending the video frame carrying the target frame serial number to the terminal device, and progressively increasing the number of retransmission times by one; and when the target frame serial number includes the frame serial number and the split frame serial number, and the number of retransmission times corresponding to the target frame serial number is not less than the retransmission threshold, performing the determining of the number of target frame serial numbers corresponding to the timestamps within the predefined time period.

\* \* \* \* \*